(12) United States Patent
Li

(10) Patent No.: US 10,382,990 B2
(45) Date of Patent: Aug. 13, 2019

(54) UPLINK TRANSMISSION POWER DETERMINING METHOD AND USER EQUIPMENT

(71) Applicant: Huawei Technologies Co., Ltd., Shenzhen (CN)

(72) Inventor: Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/673,230

(22) Filed: Aug. 9, 2017

(65) Prior Publication Data

US 2017/0339591 A1 Nov. 23, 2017

Related U.S. Application Data

(63) Continuation of application No. 15/073,422, filed on Mar. 17, 2016, now Pat. No. 9,769,691, which is a
(Continued)

(30) Foreign Application Priority Data

Oct. 9, 2011 (CN) .......................... 2011 1 0302787

(51) Int. Cl.
*H04W 24/08* (2009.01)
*H04W 52/14* (2009.01)
(Continued)

(52) U.S. Cl.
CPC .............. *H04W 24/08* (2013.01); *H04L 5/00* (2013.01); *H04W 52/146* (2013.01);
(Continued)

(58) Field of Classification Search
None
See application file for complete search history.

(56) References Cited

U.S. PATENT DOCUMENTS

2012/0300715 A1\* 11/2012 Pelletier ............ H04W 56/0005
370/329
2013/0028198 A1 1/2013 Yamada
(Continued)

FOREIGN PATENT DOCUMENTS

CN 102104905 A 6/2011
CN 102123437 A 7/2011
(Continued)

OTHER PUBLICATIONS

"LTE Carrier Aggregation Enhancements," 3GPP TSG RAN Meeting #51, Kansas City,USA, RP-110451,3rd Generation Partnership Project, Valbonne, France (Mar. 15-18, 2011).
(Continued)

*Primary Examiner* — Kodzovi Acolatse
(74) *Attorney, Agent, or Firm* — Leydig, Voit & Mayer, Ltd.

(57) ABSTRACT

Embodiments of the present invention provide an uplink transmission power determining method and a user equipment. A user equipment determines a transmission situation of at least one of: a PUCCH, a PUSCH, and an SRS on another cell except a secondary cell in a subframe corresponding to a preamble to be transmitted on the secondary cell, so that the user equipment can determine an uplink transmission power of the user equipment according to the determined transmission situation, thereby solving a problem that it is not provided in the prior art that how a user equipment determines an uplink transmission power of the user equipment when random access is executed through a secondary cell.

10 Claims, 1 Drawing Sheet

```
┌─────────────────────────────────────────────┐
│ A user equipment determines a transmission  │
│  situation of uplink transmission on another│──101
│  cell except a secondary cell in a subframe │
│  corresponding to a preamble to be          │
│  transmitted on the secondary cell          │
└─────────────────────────────────────────────┘
                     │
                     ▼
┌─────────────────────────────────────────────┐
│ The user equipment determines an uplink     │
│  transmission power of the user equipment   │──102
│  according to the determined transmission   │
│  situation                                   │
└─────────────────────────────────────────────┘
```

Related U.S. Application Data continuation of application No. 14/246,868, filed on Apr. 7, 2014, now Pat. No. 9,326,172, which is a continuation of application No. PCT/CN2012/081974, filed on Sep. 26, 2012.

(51) Int. Cl.
| | | |
|---|---|---|
| *H04W 52/32* | (2009.01) | |
| *H04W 72/04* | (2009.01) | |
| *H04L 5/00* | (2006.01) | |
| *H04W 88/02* | (2009.01) | |
| *H04W 52/34* | (2009.01) | |

(52) U.S. Cl.
CPC ..... *H04W 52/325* (2013.01); *H04W 72/0413* (2013.01); *H04W 52/34* (2013.01); *H04W 88/02* (2013.01)

(56) References Cited

U.S. PATENT DOCUMENTS

| | | | |
|---|---|---|---|
| 2013/0058315 A1 | 3/2013 | Feuersaenger et al. | |
| 2013/0114505 A1* | 5/2013 | Haim | H04W 52/146 370/328 |
| 2013/0188570 A1 | 7/2013 | Zhao et al. | |
| 2013/0188580 A1 | 7/2013 | Dinan | |
| 2013/0195048 A1 | 8/2013 | Ekpenyong et al. | |
| 2013/0336228 A1 | 12/2013 | Zhao et al. | |
| 2014/0126530 A1 | 5/2014 | Siomina et al. | |
| 2014/0133449 A1* | 5/2014 | Xu | H04W 52/367 370/329 |
| 2014/0348078 A1* | 11/2014 | Kim | H04W 52/146 370/329 |

FOREIGN PATENT DOCUMENTS

| | | |
|---|---|---|
| EP | 2362699 A1 | 8/2011 |
| WO | 2011120716 A1 | 10/2011 |

OTHER PUBLICATIONS

"LTE Carrier Aggregation Enhancements—Performance," 3GPP TSG RAN Meeting #51, Kansas City,USA, RP-110451,3rd Generation Partnership Project, Valbonne, France (Mar. 15-18, 2011).

"LTE Carrier Aggregation Enhancements—Core Part," 3GPP TSG RAN Meeting #51, Kansas City,USA, RP-110451,3rd Generation Partnership Project, Valbonne, France (Mar. 15-18, 2011).

"Multiple Timing Advances for Carrier Aggregation," 3GPP TSG RAN WG1 Meeting #66bis, Zhuhai, China, R1-113314, 3rd Generation Partnership Project, Valbonne, France(Oct. 10-14, 2011).

"3rd Generation Partnership Project;Technical Specification Group Radio Access Network; Evolved Universal Terrestrial Radio Access (E-UTRA); Physical layer procedures (Release 10)," Draft3GPP TS 36.213, Va.0.0, pp. 1-98, 3rd Generation Partnership Project. Valbonne. France (Dec. 2012).

"3rd Generation Partnership Project;Technical Specification Group Radio Access Network: Evolved Universal Terrestrial Radio Access (E-UTRA); Physical layer procedures (Release 10)," 3GPP TS 36.213, V10.3.0, pp. 1-122, 3rd Generation Partnership Project, Valbonne, France (Sep. 2011).

"3rd Generation Partnership Project; Technical Specification Group Radio Access Network; Evolved Universal Terrestrial Radio Access (E-UTRA); Physical layer procedures (Release 10)," 3GPP TS 36.213, V10.2.0, pp. 1-120, 3rd Generation Partnership Project, Valbonne. France (Jun. 2011).

"PRACH Enhancement and UL Power Control for CoMP Scenario 4", Research in Motion, UK Limited, 3GPP TSG RAN WG1 Meeting #66, R1-112372, Athens, Greece, Aug. 22-26, 2011, total 6 pages.

"Remaining issues on uplink power control", Nokia Siemens Networks, 3GPP TSG RAN WG1 #62bis Meeting, R1-105525, Xian, China, Oct. 11-15, 2010, total 4 pages.

* cited by examiner

UPLINK TRANSMISSION POWER DETERMINING METHOD AND USER EQUIPMENT

CROSS-REFERENCE TO RELATED APPLICATIONS

This application is a continuation of U.S. patent application Ser. No. 15/073,422, filed on Mar. 17, 2016, which is a continuation of U.S. patent application Ser. No. 14/246,868, filed on Apr. 7, 2014, now U.S. Pat. No. 9,326,172. The U.S. patent application Ser. No. 14/246,868 is a continuation of International Patent Application No. PCT/CN2012/081974, filed on Sep. 26, 2012, which claims priority to Chinese Patent Application No. 201110302787.3, filed on Oct. 9, 2011. The afore-mentioned patent applications are hereby incorporated by reference in their entireties.

TECHNICAL FIELD

Embodiments of the present invention relate to communications technologies, and in particular, to an uplink transmission power determining method and a user equipment.

BACKGROUND

In a wireless communications system having a feature of cell aggregation (CA), a user equipment may communicate with a base station through multiple cells. Generally speaking, in the prior art, a user equipment may execute random access through a primary cell to achieve uplink synchronization. However, transmission paths through which an uplink signal of the user equipment is sent to the base station through different cells may be different, for example, an uplink signal sent by the user equipment to the base station through some cells may need to pass through a relay node, but an uplink signal sent to the base station through other cells may not need to pass through a relay node, so that the user equipment cannot achieve uplink synchronization by executing random access only through a primary cell, and random access further needs to be executed through a secondary cell to achieve uplink synchronization.

However, it is not provided in the prior art that how a user equipment determines an uplink transmission power of the user equipment when random access is executed through a secondary cell.

SUMMARY

Embodiments of the present invention provide an uplink transmission power determining method and a user equipment, so as to enable a user equipment to determine an uplink transmission power of the user equipment when random access is executed through a secondary cell.

In one aspect, an uplink transmission power determining method is provided, which includes:

determining, by a user equipment, a transmission situation of at least one of: a PUCCH, a PUSCH, and an SRS on another cell except a secondary cell in a subframe corresponding to a preamble to be transmitted on the secondary cell; and determining, by the user equipment, an uplink transmission power of the user equipment according to the determined transmission situation.

In another aspect, a user equipment is provided, which includes:

a cell determining unit, configured to determine a transmission situation of at least one of: a PUCCH, a PUSCH, and an SRS on another cell except a secondary cell in a subframe corresponding to a preamble to be transmitted on the secondary cell; and a power determining unit, configured to determine an uplink transmission power of the user equipment according to the determined transmission situation.

In can be seen from the foregoing technical solutions that, in the embodiments of the present invention, a user equipment determines a transmission situation of at least one of: a PUCCH, a PUSCH, and an SRS on another cell except a secondary cell in a subframe corresponding to a preamble to be transmitted on the secondary cell, so that the user equipment can determine an uplink transmission power of the user equipment according to the determined transmission situation, thereby solving a problem that it is not provided in the prior art that how a user equipment determines an uplink transmission power of the user equipment when random access is executed through a secondary cell.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

The technical solutions of the present invention can be applied in various wireless communications networks, such as: a global system for mobile communications (GSM), a general packet radio service (GPRS) network, a code division multiple access (CDMA) network, a wideband code division multiple access (WCDMA) network, a time division-synchronous code division multiple access (TD-SCDMA) network, a long term evolution (LTE) network or a long term evolution advanced (LTE-A) network, and subsequent evolved networks. The terms "network" and "system" are interchangeable.

A base station, for example, may be a base station (BTS) in a GSM network, a GPRS network, or a CDMA network, or may be a base station (NodeB) in a WCDMA network, or may be an evolved Node B (eNB) eNB in an LTE network or an LTE-A network.

Figure 1:
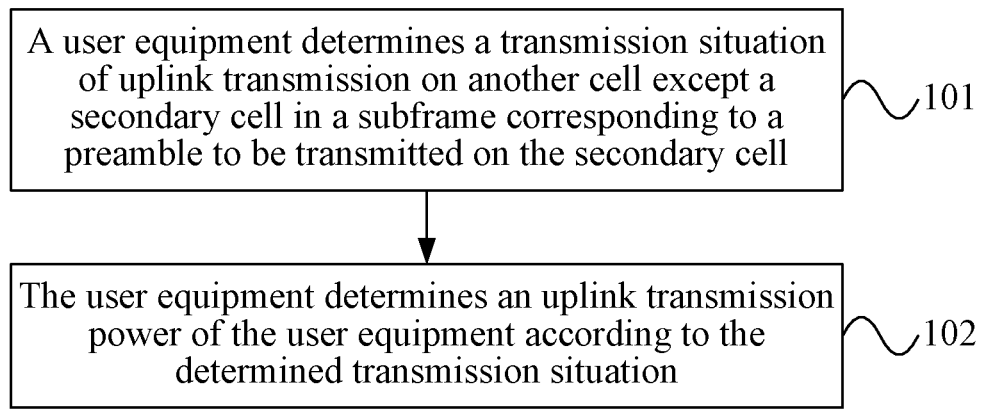
FIG. 1 is a schematic flow chart of an uplink transmission power determining method provided in an embodiment of the present invention.

FIG. 1 is a schematic flow chart of an uplink transmission power determining method provided in an embodiment of the present invention, and as shown in FIG. 1, the uplink transmission power determining method in this embodiment may include the following steps.

101: A user equipment determines a transmission situation of uplink transmission on another cell except a secondary cell in a subframe corresponding to a preamble to be transmitted on the secondary cell.

The transmission situation of the uplink transmission may include a transmission situation of at least one of: a physical uplink control channel (PUCCH), a physical uplink shared channel (PUSCH), and a sounding reference signal (SRS).

102: The user equipment determines an uplink transmission power of the user equipment according to the determined transmission situation.

In an embodiment provided in the present invention, if the transmission situation determined by the user equipment is that no PUCCH, PUSCH, or SRS needs to be transmitted on another cell in the subframe corresponding to the preamble to be transmitted on the secondary cell, the user equipment may determine a first transmission power of the preamble according to a maximum allowable power of the secondary cell, a target received power of the preamble, and a target path loss of the secondary cell, where the first transmission power of the preamble may be a smallest value between a sum of the target received power of the preamble and the target path loss of the secondary cell and the maximum allowable power of the secondary cell, that is, the user equipment may determine the first transmission power of the preamble according to Formula (1):

$$P_{PRACH}(i)=\min\{P_{CMAX,c}(i), \text{PREAMBLE\_RECEIVED\_TARGET\_POWER}+PL_c\} \quad (1)$$

where i represents a subframe, that is, the subframe corresponding to the preamble; c represents a cell; $P_{PRACH}(i)$ represents the first transmission power of the preamble; $P_{CMAX,c}(i)$ represents the maximum allowable power of the secondary cell, that is, the maximum allowable power of the secondary cell in the subframe i; PREAMBLE_RECEIVED_TARGET_POWER represents the target received power of the preamble; and $PL_c$ represents the target path loss of the secondary cell.

In another embodiment provided in the present invention, if the transmission situation determined by the user equipment is that at least one of: a PUCCH, a PUSCH, and an SRS needs to be transmitted on another cell in a subframe except a first subframe among subframes corresponding to the preamble to be transmitted on the secondary cell, the user equipment may determine a second transmission power of the preamble according to Formula (1), where $P_{PRACH}(i)$ represents the second transmission power of the preamble.

If that the user equipment determines that at least one of: a PUCCH, a PUSCH, and an SRS needs to be transmitted on another cell in a subframe except a first subframe among subframes corresponding to the preamble to be transmitted on the secondary cell is that the PUCCH needs to be transmitted on the another cell in the subframe except the first subframe among the subframes corresponding to the preamble to be transmitted on the secondary cell, the user equipment may determine a first transmission power of the PUCCH according to a transmission power of the PUCCH obtained by the user equipment by performing uplink power control, a maximum allowable power, and the second transmission power of the preamble, where the first transmission power of the PUCCH may be a smallest value among a difference between the maximum allowable power and the second transmission power of the preamble and the transmission power of the PUCCH obtained by the user equipment by performing uplink power control, that is, the user equipment may determine the first transmission power of the PUCCH according to Formula (3):

$$P_{PUCCH}(i)=\min\{P_{PUCCH\_0}(i),(P_{CMAX}(i)-P_{PRACH}(i))\} \quad (3)$$

where $P_{PUCCH}(i)$ represents the first transmission power of the PUCCH; $P_{PUCCH\_0}(i)$ represents the transmission power of the PUCCH obtained by the user equipment by performing uplink power control; $P_{CMAX}(i)$ represents the maximum allowable power, that is, a maximum allowable power of a subframe i; and $P_{PRACH}(i)$ represents the second transmission power of the preamble.

If the user equipment determines that in addition to the PUCCH, the PUSCH needs to be transmitted on the another cell in the subframe except the first subframe among the subframes corresponding to the preamble to be transmitted on the secondary cell, the user equipment may determine a transmission power of the PUSCH, which may be marked as a first transmission power of the PUSCH, according to the maximum allowable power, the first transmission power of the PUCCH, and the second transmission power of the preamble, where the first transmission power of the PUSCH may be smaller than or equal to the maximum allowable power minus the first transmission power of the PUCCH and the second transmission power of the preamble, that is, the user equipment may determine the first transmission power of the PUSCH according to Formula (4):

$$\sum_c w(i) \cdot P_{PUSCH,c}(i) \leq (P_{CMAX}(i)-P_{PUCCH}(i)-P_{PRACH}(i)) \quad (4)$$

where w(i) represents a weighting factor, and its value range is [0, 1]; c represents a cell;

$$\sum_c w(i) \cdot P_{PUSCH,c}(i)$$

represents the first transmission power of the PUSCH, that is, a sum of transmission powers of the PUSCH of all cells; $P_{PUCCH}(i)$ represents the first transmission power of the PUCCH; $P_{CMAX}(i)$ represents the maximum allowable power; and $P_{PRACH}(i)$ represents the second transmission power of the preamble. Or, the user equipment may determine a transmission power of the PUSCH, which may be marked as a second transmission power of the PUSCH, according to Formula (5) and Formula (6):

$$\sum_{c \neq j} w(i) \cdot P_{PUSCH,c}(i) \leq \quad (5)$$
$$(P_{CMAX}(i)-P_{PUSCH,j}(i)-P_{PUCCH}(i)-P_{PRACH}(i))$$

$$P_{PUSCH,j}(i) = \min\{P_{PUSCH,j\_0}(i),(P_{CMAX}(i)-P_{PUCCH}(i)-P_{PRACH}(i))\} \quad (6)$$

where w(i) represents a weighting factor, and its value range is [0, 1]; c represents a cell;

$$\sum_{c \neq j} w(i) \cdot P_{PUSCH,c}(i)$$

represents the second transmission power of the PUSCH, that is, a sum of transmission powers of the PUSCH of cells except a cell bearing uplink signaling; $P_{PUCCH}(i)$ represents the first transmission power of the PUCCH; $P_{CMAX}(i)$ represents the maximum allowable power; $P_{PRACH}(i)$ represents the second transmission power of the preamble; and $P_{PSCHU,j\_0}(i)$ represents a transmission power that is of a PUSCH bearing the uplink signaling and is obtained by the user equipment by performing uplink power control.

If that the user equipment determines that at least one of: a PUCCH, a PUSCH, and an SRS needs to be transmitted on another cell in a subframe except a first subframe among subframes corresponding to the preamble to be transmitted on the secondary cell is that the PUSCH needs to be transmitted on the another cell in the subframe except the first subframe among the subframes corresponding to the preamble to be transmitted on the secondary cell, the user equipment may determine a transmission power of the PUSCH, which may be marked as a third transmission power of the PUSCH, according to Formula (7):

$$\sum_{c} w(i) \cdot P_{PUSCH,c}(i) \leq (P_{CMAX}(i) - P_{PRACH}(i)) \quad (7)$$

where w(i) represents a weighting factor, and its value range is [0, 1]; c represents a cell;

$$\sum_{c} w(i) \cdot P_{PUSCH,c}(i)$$

represents the third transmission power of the PUSCH; $P_{CMAX}(i)$ represents the maximum allowable power; and $P_{PRACH}(i)$ represents the second transmission power of the preamble. Or, the user equipment may determine a transmission power of the PUSCH, which may be marked as a fourth transmission power of the PUSCH, according to Formula (8) and Formula (9):

$$\sum_{c \neq j} w(i) \cdot P_{PUSCH,c}(i) \leq (P_{CMAX}(i) - P_{PUSCH,j}(i) - P_{PRACH}(i)) \quad (8)$$

$$P_{PUSCH,j}(i) = \min\{P_{PUSCH,j\_0}(i), (P_{CMAX}(i) - P_{PRACH}(i))\} \quad (9)$$

where w(i) represents a weighting factor, and its value range is [0, 1]; c represents a cell;

$$\sum_{c \neq j} w(i) \cdot P_{PUSCH,c}(i)$$

represents the fourth transmission power of the PUSCH, that is, a sum of transmission powers of the PUSCH of cells except a cell bearing uplink signaling; $P_{CMAX}(i)$ represents the maximum allowable power; $P_{PRACH}(i)$ represents the second transmission power of the preamble; and $P_{PUSCH,j\_0}(i)$ represents a transmission power that is of a PUSCH bearing the uplink signaling and is obtained by the user equipment by performing uplink power control.

In another embodiment provided in the present invention, if the transmission situation determined by the user equipment is that a PUCCH needs to be transmitted on another cell in a first subframe among subframes corresponding to the preamble to be transmitted on the secondary cell, the user equipment may determine a transmission power of the preamble, which may be marked as a third transmission power of the preamble, according to Formula (1); and determine that a transmission power of the PUCCH is 0, which may be marked as a second transmission power of the PUCCH. Or, the user equipment may further determine that a transmission power of the PUCCH is a transmission power of the PUCCH obtained by the user equipment by performing uplink power control, where the determined transmission power of the PUCCH may be marked as a third transmission power of the PUCCH; and determine that a transmission power of the preamble is 0, which may be marked as a fourth transmission power of the preamble. Or, the user equipment may further determine a transmission power of the preamble, which may be marked as a fifth transmission power of the preamble, according to Formula (1), where $P_{PRACH}(i)$ represents the fifth transmission power of the preamble; and determine a transmission power of the PUCCH, which may be marked as a fourth transmission power of the PUCCH, according to Formula (12):

$$P_{PUCCH}(i) = \min\{P_{PUCCH\_0}(i), (P_{CMAX}(i) - P_{PRACH}(i))\} \quad (12)$$

where $P_{PUCCH}(i)$ represents the fourth transmission power of the PUCCH; $P_{PUCCH\_0}(i)$ represents the transmission power of the PUCCH obtained by the user equipment by performing uplink power control; $P_{CMAX}(i)$ represents a maximum allowable power; and $P_{PRACH}(i)$ represents the fifth transmission power of the preamble. Or, the user equipment may further determine that a transmission power of the PUCCH is a transmission power of the PUCCH obtained by the user equipment by performing uplink power control, where the determined transmission power of the PUCCH may be marked as a fifth transmission power of the PUCCH; and determine a transmission power of the preamble, which may be marked as a sixth transmission power of the preamble, according to Formula (13):

$$P'_{PRACH}(i) = \min\{P_{PRACH}(i), (P_{CMAX}(i) - P_{PUCCH}(i))\} \quad (13)$$

where $P'_{PRACH}(i)$ represents the sixth transmission power of the preamble; $P_{PRACH}(i)$ represents the third transmission power of the preamble; $P_{PUCCH}(i)$ represents the fifth transmission power of the PUCCH; and $P_{CMAX}(i)$ represents the maximum allowable power.

If the user equipment determines that a PUSCH needs to be transmitted on another cell in the first subframe among the subframes corresponding to the preamble to be transmitted on the secondary cell in addition to that a PUSCH needs to be transmitted on the another cell in the subframe except the first subframe among the subframes corresponding to the preamble to be transmitted on the secondary cell, the user equipment may further determine that a transmission power of the PUSCH is 0, which may be marked as a fifth transmission power of the PUSCH. Or, the user equipment may further determine that a transmission power of the PUSCH is a transmission power of the PUSCH obtained by the user equipment by performing uplink power control, where the determined transmission power of the PUSCH may be marked as a sixth transmission power the PUSCH. Or, the user equipment may further determine a transmission power of the PUSCH, which may be marked as a seventh transmission power of the PUSCH, according to Formula (14); or determine a transmission power of the PUSCH, which may be marked as an eighth transmission power of the PUSCH, according to Formula (15) and Formula (16):

$$\sum_c w(i) \cdot P_{PUSCH,c}(i) \leq (P_{CMAX}(i) - P_{PUCCH}(i) - P_{PRACH}(i)) \quad (14)$$

where w(i) represents a weighting factor, and its value range is [0, 1]; c represents a cell;

$$\sum_c w(i) \cdot P_{PUSCH,c}(i)$$

represents the seventh transmission power of the PUSCH; $P_{PUCCH}(i)$ represents the third transmission power of the PUCCH; $P_{CMAX}(i)$ represents the maximum allowable power; and $P_{PRACH}(i)$ represents the fifth transmission power of the preamble;

$$\sum_{c \neq j} w(i) \cdot P_{PUSCH,c}(i) \leq \quad (15)$$

$$(P_{CMAX}(i) - P_{PUSCH,j}(i) - P_{PUCCH}(i) - P_{PRACH}(i))$$

$$P_{PUSCH,j}(i) = \min\{P_{PUSCH,j\_0}(i), (P_{CMAX}(i) - P_{PUCCH}(i) - P_{PRACH}(i))\} \quad (16)$$

where w(i) represents a weighting factor, and its value range is [0, 1]; c represents a cell;

$$\sum_{c \neq j} w(i) \cdot P_{PUSCH,c}(i)$$

represents the eighth transmission power of the PUSCH, that is, a sum of transmission powers of the PUSCH of cells except a cell bearing uplink signaling; $P_{PUCCH}(i)$ represents the third transmission power of the PUCCH; $P_{CMAX}(i)$ represents the maximum allowable power; $P_{PRACH}(i)$ represents the fifth transmission power of the preamble, and $P_{PUSCH,j\_0}(i)$ represents a transmission power that is of a PUSCH bearing the uplink signaling and is obtained by the user equipment by performing uplink power control. Or, the user equipment may determine that a transmission power of the PUSCH is a transmission power of the PUSCH obtained by the user equipment by performing uplink power control, where the determined transmission power of the PUSCH may be marked as a ninth transmission power of the PUSCH; and determine a transmission power of the preamble, which may be marked as a seventh transmission power of the preamble, according to Formula (17):

$$P'_{PRACH}(i) = \quad (17)$$

$$\min\left\{P_{PRACH}(i), \left(P_{CMAX}(i) - P_{PUCCH}(i) - \sum_c w(i) \cdot P_{PUSCH,c}(i)\right)\right\}$$

where $P'_{PRACH}(i)$ represents the seventh transmission power of the preamble; $P_{PRACH}(i)$ represents the third transmission power of the preamble; w(i) represents a weighting factor, and its value range is [0, 1]; c represents a cell;

$$\sum_c w(i) \cdot P_{PUSCH,c}(i)$$

represents the ninth transmission power of the PUSCH; $P_{PUCCH}(i)$ represents the fifth transmission power of the PUCCH; and $P_{CMAX}(i)$ represents the maximum allowable power.

In another embodiment provided in the present invention, if the transmission situation determined by the user equipment is that a PUSCH needs to be transmitted on another cell in a first subframe among subframes corresponding to the preamble to be transmitted on the secondary cell, the user equipment may further determine a transmission power of the preamble, which may be marked as an eighth transmission power of the preamble, according to Formula (1), where $P_{PRACH}(i)$ represents the eighth transmission power of the preamble; and determine that a transmission power of the PUSCH is 0, which may be marked as a tenth transmission power of the PUSCH. Or, the user equipment may further determine that a transmission power of the PUSCH is a transmission power of the PUSCH obtained by the user equipment by performing uplink power control, where the determined transmission power of the PUSCH may be marked as an eleventh transmission power of the PUSCH; and determine that a transmission power of the preamble is 0, which may be marked as a ninth transmission power of the preamble. Or, the user equipment may further determine a transmission power of the preamble, which may be marked as a tenth transmission power of the preamble, according to Formula (1), where $P_{PRACH}(1)$ represents the tenth transmission power of the preamble; and determine a transmission power of the PUSCH, which may be marked as a twelfth transmission power of the PUSCH, according to Formula (20), or determine a transmission power of the PUSCH, which may be marked as a thirteenth transmission power of the PUSCH, according to Formula (21) and Formula (22):

$$\sum_c w(i) \cdot P_{PUSCH,C}(i) \leq (P_{CMAX}(i) - P_{PRACH}(i)) \quad (20)$$

where w(i) represents a weighting factor, and its value range is [0, 1]; c represents a cell;

$$\sum_c w(i) \cdot P_{PUSCH,c}(i)$$

represents the twelfth transmission power of the PUSCH; $P_{CMAX}(i)$ represents the maximum allowable power; and $P_{PRACH}(i)$ represents the tenth transmission power of the preamble; and $$\sum_{c \neq j} w(i) \cdot P_{PUSCH,c}(i) \leq (P_{CMAX}(i) - P_{PUSCH,j}(i) - P_{PRACH}(i)) \quad (21)$$

$$P_{PUSCH,j}(i) = \min\{P_{PUSCH,j\_0}(i), (P_{CMAX}(i) - P_{PRACH}(i))\} \quad (22)$$

where w(i) represents a weighting factor, and its value range is [0, 1]; c represents a cell;

$$\sum_{c \neq j} w(i) \cdot P_{PUSCH,c}(i)$$

represents the thirteenth transmission power of the PUSCH, that is, a sum of transmission powers of the PUSCH of cells except a cell bearing uplink signaling; $P_{CMAX}(i)$ represents the maximum allowable power; $P_{PRACH}(i)$ represents the tenth transmission power of the preamble; and $P_{PUSCH,j\_0}(i)$ represents a transmission power that is of a PUSCH bearing the uplink signaling and is obtained by the user equipment by performing uplink power control. Or, the user equipment may further determine that a transmission power of the PUSCH is a transmission power of the PUSCH obtained by the user equipment by performing uplink power control, where the determined transmission power of the PUSCH may be marked as a thirteenth transmission power of the PUSCH; and determine a transmission power of the preamble according to Formula (23), where the transmission power may be marked as an eleventh transmission power of the preamble:

$$P'_{PRACH}(i) = \min\left\{P_{PRACH}(i), \left(P_{CMAX}(i) - \sum_c w(i) \cdot P_{PUSCH,c}(i)\right)\right\} \quad (23)$$

where $P'_{PRACH}(i)$ represents the eleventh transmission power of the preamble;

$$\sum_c w(i) \cdot P_{PUSCH,c}(i)$$

represents the thirteenth transmission power of the PUSCH; and $P_{CMAX}(i)$ represents the maximum allowable power.

In another embodiment provided in the present invention, if the transmission situation determined by the user equipment is that an SRS needs to be transmitted on another cell in the subframe corresponding to the preamble to be transmitted on the secondary cell, and if a transmission power of the preamble is not 0, the user equipment determines that a transmission power of the SRS is 0.

In this embodiment, a user equipment determines a transmission situation of at least one of: a PUCCH, a PUSCH, and an SRS on another cell except a secondary cell in a subframe corresponding to a preamble to be transmitted on the secondary cell, so that the user equipment can determine an uplink transmission power of the user equipment according to the determined transmission situation, thereby solving a problem that it is not provided in the prior art that how a user equipment determines an uplink transmission power of the user equipment when random access is executed through a secondary cell.

It should be noted that, for the foregoing method embodiments, for a purpose of brevity of description, the methods are described as a combination of a series of actions, but persons skilled in the art should know that, the present invention is not limited to a sequence of the actions, because some steps may be performed in another sequence or concurrently according to the present invention. Next, persons skilled in the art should also know that, the embodiments described in the specification are all exemplary embodiments, and the related actions and modules are not necessarily required in the present invention.

In the foregoing embodiments, description for the embodiments has its own emphasis, and for a part that is not described in detail in a certain embodiment, reference may be made to relevant description in other embodiments.

Figure 2:
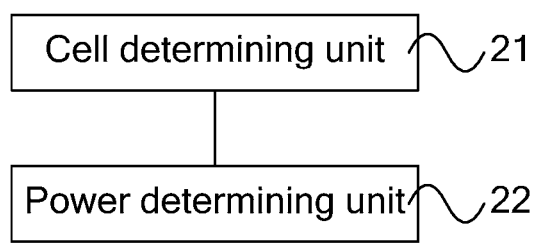
FIG. 2 is a schematic structural diagram of a user equipment provided in another embodiment of the present invention.

FIG. 2 is a schematic structural diagram of a user equipment provided in another embodiment of the present invention. As shown in FIG. 2, the user equipment in this embodiment may include a cell determining unit 21 and a power determining unit 22. The cell determining unit 21 is configured to determine a transmission situation of uplink transmission on another cell except a secondary cell in a subframe corresponding to a preamble to be transmitted on the secondary cell. The transmission situation of the uplink transmission may be a transmission situation of at least one of: a PUCCH, a PUSCH, and an SRS. The power determining unit 22 is configured to determine an uplink transmission power of the user equipment according to the determined transmission situation.

Functions of the user equipment in the embodiment corresponding to FIG. 1 may be implemented by the user equipment provided in this embodiment.

In an embodiment of the present invention, if the transmission situation determined by the cell determining unit 21 is that no PUCCH, PUSCH, or SRS needs to be transmitted on another cell in the subframe corresponding to the preamble to be transmitted on the secondary cell, the power determining unit 22 may determine a first transmission power of the preamble according to Formula (1):

$$P_{PRACH}(i) = \min\{P_{CMAX,c}(i), \text{PREAMBLE\_RECEIVED\_TARGET\_POWER} + PL_c\} \quad (1)$$

where i represents a subframe, that is, the subframe corresponding to the preamble; c represents a cell; $P_{PRACH}(i)$ represents the first transmission power of the preamble; $P_{CMAX,c}(i)$ represents a maximum allowable power of the secondary cell; PREAMBLE_RECEIVED_TARGET_POWER represents a target received power of the preamble; and $PL_c$ represents a target path loss of the secondary cell.

In another embodiment of the present invention, if the transmission situation determined by the cell determining unit 21 is that at least one of: a PUCCH, a PUSCH, and an SRS needs to be transmitted on another cell in a subframe except a first subframe among subframes corresponding to the preamble to be transmitted on the secondary cell, the power determining unit 22 may specifically determine a second transmission power of the preamble according to Formula (1), where $P_{PRACH}(i)$ represents the second transmission power of the preamble.

In another embodiment of the present invention, if the transmission situation determined by the cell determining unit 21 is that a PUCCH needs to be transmitted on another cell in a subframe except a first subframe among subframes corresponding to the preamble to be transmitted on the secondary cell, the power determining unit 22 in this embodiment may further determine a first transmission power of the PUCCH according to Formula (3):

$$P_{PUCCH}(i) = \min\{P_{PUCCH\_0}(i), (P_{CMAX}(i) - P_{PRACH}(i))\} \quad (3)$$

where $P_{PUCCH}(i)$ represents the first transmission power of the PUCCH; $P_{PUCCH\_0}(i)$ represents a transmission power of the PUCCH obtained by the user equipment by performing uplink power control; $P_{CMAX}(i)$ represents the maximum allowable power; and $P_{PRACH}(i)$ represents the second transmission power of the preamble.

If the transmission situation determined by the cell determining unit 21 further includes that a PUSCH needs to be transmitted on the another cell in the subframe except the first subframe among the subframes corresponding to the preamble to be transmitted on the secondary cell, the power determining unit 22 in this embodiment may further determine a first transmission power of the PUSCH according to Formula (4):

$$\sum_c w(i) \cdot P_{PUSCH,c}(i) \leq (P_{CMAX}(i) - P_{PUCCH}(i) - P_{PRACH}(i)) \quad (4)$$

where w(i) represents a weighting factor, and its value range is [0, 1]; c represents a cell;

$$\sum_c w(i) \cdot P_{PUSCH,c}(i)$$

represents the first transmission power of the PUSCH, that is, a sum of transmission powers of the PUSCH of all cells; $P_{PUCCH}(i)$ represents the first transmission power of the PUCCH; $P_{CMAX}(i)$ represents the maximum allowable power; and $P_{PRACH}(i)$ represents the second transmission power of the preamble. Or, the power determining unit 22 in this embodiment may further determine a second transmission power of the PUSCH according to Formula (5) and Formula (6):

$$\sum_{c \neq j} w(i) \cdot P_{PUSCH,c}(i) \leq (P_{CMAX}(i) - P_{PUSCH,j} - P_{PUCCH}(i) - P_{PRACH}(i)) \quad (5)$$

$$P_{PUSCH,j}(i) = \min\{P_{PUSCH,j\_0}(i), (P_{CMAX}(i) - P_{PUCCH}(i) - P_{PRACH}(i))\} \quad (6)$$

where w(i) represents a weighting factor, and its value range is [0, 1]; c represents a cell;

$$\sum_{c \neq j} w(i) \cdot P_{PUSCH,c}(i)$$

represents the second transmission power of the PUSCH, that is, a sum of transmission powers of the PUSCH of cells except a cell bearing uplink signaling; $P_{PUCCH}(i)$ represents the first transmission power of the PUCCH; $P_{CMAX}(i)$ represents the maximum allowable power; $P_{PRACH}(i)$ represents the second transmission power of the preamble; and $P_{PUSCH,j\_0}(i)$ represents a transmission power that is of a PUSCH bearing the uplink signaling and is obtained by the user equipment by performing uplink power control.

In another embodiment of the present invention, if the transmission situation determined by the cell determining unit 21 is that a PUSCH needs to be transmitted on another cell in a subframe except a first subframe among subframes corresponding to the preamble to be transmitted on the secondary cell, the power determining unit 22 in this embodiment may further determine a third transmission power of the PUSCH according to Formula (7):

$$\sum_c w(i) \cdot P_{PUSCH,c}(i) \leq (P_{CMAX}(i) - P_{PRACH}(i)) \quad (7)$$

where w(i) represents a weighting factor, and its value range is [0, 1]; c represents a cell;

$$\sum_c w(i) \cdot P_{PUSCH,c}(i)$$

represents the third transmission power of the PUSCH; $P_{CMAX}(i)$ represents the maximum allowable power; and $P_{PRACH}(i)$ represents the second transmission power of the preamble. Or, the power determining unit 22 in this embodiment may further determine a fourth transmission power of the PUSCH according to Formula (8) and Formula (9):

$$\sum_{c \neq j} w(i) \cdot P_{PUSCH,c}(i) \leq (P_{CMAX}(i) - P_{PUSCH,j}(i) - P_{PRACH}(i)) \quad (8)$$

$$P_{PUSCH,j}(i) = \min\{P_{PUSCH,j\_0}(i), (P_{CMAX}(i) - P_{PRACH}(i))\} \quad (9)$$

where w(i) represents a weighting factor, and its value range is [0, 1]; c represents a cell;

$$\sum_{c \neq j} w(i) \cdot P_{PUSCH,c}(i)$$

represents the fourth transmission power of the PUSCH; $P_{CMAX}(i)$ represents the maximum allowable power; $P_{PRACH}(i)$ represents the second transmission power of the preamble; and $P_{PUSCH,j\_0}(i)$ represents a transmission power that is of a PUSCH bearing uplink signaling and is obtained by the user equipment by performing uplink power control.

In another embodiment of the present invention, the transmission situation determined by the cell determining unit 21 in this embodiment is that a PUCCH needs to be transmitted on another cell in a first subframe among subframes corresponding to the preamble to be transmitted on the secondary cell, and the power determining unit 22 in this embodiment may specifically determine a third transmission power of the preamble according to Formula (1); and determine that a second transmission power of the PUCCH is 0, where $P_{PRACH}(i)$ represents the third transmission power of the preamble. Or, the power determining unit 22 in this embodiment may specifically determine a third transmission power of the PUCCH, where the third transmission power is a transmission power of the PUCCH obtained by the user equipment by performing uplink power control; and determine that a fourth transmission power of the preamble is 0. Or, the power determining unit 22 in this embodiment may specifically determine a fifth transmission power of the preamble according to Formula (1), where $P_{PRACH}(i)$ represents the fifth transmission power of the preamble; and determine a fourth transmission power of the PUCCH according to Formula (12):

$$P_{PUCCH}(i) = \min\{P_{PUCCH\_0}(i), (P_{CMAX}(i) - P_{PRACH}(i))\} \quad (12)$$

where $P_{PUCCH}(i)$ represents the fourth transmission power of the PUCCH; $P_{PUCCH\_0}(i)$ represents the transmission power of the PUCCH obtained by the user equipment by performing uplink power control; $P_{CMAX}(i)$ represents the maximum allowable power; and $P_{PRACH}(i)$ represents the fifth transmission power of the preamble. Or, the power determining unit 22 in this embodiment may specifically determine a fifth transmission power of the PUCCH, where the fifth transmission power is a transmission power of the PUCCH obtained by the user equipment by performing uplink power control; and determine a sixth transmission power of the preamble according to Formula (13):

$$P'_{PRACH}(i) = \min\{P_{PRACH}(i), (P_{CMAX}(i) - P_{PUCCH}(i))\} \quad (13)$$

where $P'_{PRACH}(i)$ represents the sixth transmission power of the preamble; $P_{PRACH}(i)$ represents the third transmission power of the preamble; $P_{PUCCH}(i)$ represents the fifth transmission power of the PUCCH; and $P_{CMAX}(i)$ represents the maximum allowable power.

In another embodiment of the present invention, if the transmission situation determined by the cell determining unit 21 in this embodiment may further include that a PUSCH needs to be transmitted on another cell in a first subframe among subframes corresponding to the preamble to be transmitted on the secondary cell, the power determining unit 22 in this embodiment may further determine that a fifth transmission power of the PUSCH is 0. Or, the power determining unit 22 in this embodiment may further determine a sixth transmission power the PUSCH, where the sixth transmission power is a transmission power of the PUSCH obtained by the user equipment by performing uplink power control. Or, the power determining unit 22 in this embodiment may further determine a seventh transmission power of the PUSCH according to Formula (14), or determine an eighth transmission power of the PUSCH according to Formula (15) and Formula (16):

$$\sum_c w(i) \cdot P_{PUSCH,c}(i) \le (P_{CMAX}(i) - P_{PUCCH}(i) - P_{PRACH}(i)) \quad (14)$$

where $w(i)$ represents a weighting factor, and its value range is [0, 1]; c represents a cell;

$$\sum_c w(i) \cdot P_{PUSCH,c}(i)$$

represents the seventh transmission power of the PUSCH; $P_{PUCCH}(i)$ represents the third transmission power of the PUCCH; $P_{CMAX}(i)$ represents the maximum allowable power; and $P_{PRACH}(i)$ represents the fifth transmission power of the preamble;

$$\sum_{c \ne j} w(i) \cdot P_{PUSCH,c}(i) \le \quad (15)$$
$$(P_{CMAX}(i) - P_{PUSCH,j}(i) - P_{PUCCH}(i) - P_{PRACH}(i) - P_{PRACH}(i))$$

$$P_{PUSCH,j}(i) = \quad (16)$$
$$\min\{P_{PUSCH,j\_0}(i), (P_{CMAX}(i) - P_{PUCCH}(i) - P_{PRACH}(i))\}$$

where $w(i)$ represents a weighting factor, and its value range is [0, 1]; c represents a cell;

$$\sum_{c \ne j} w(i) \cdot P_{PUSCH,c}(i)$$

represents the eighth transmission power of the PUSCH; $P_{PUCCH}(i)$ represents the third transmission power of the PUCCH; $P_{CMAX}(i)$ represents the maximum allowable power; $P_{PRACH}(i)$ represents the fifth transmission power of the preamble, and $P_{PUSCH,j\_0}(i)$ represents a transmission power that is of a PUSCH bearing uplink signaling and is obtained by the user equipment by performing uplink power control. Or, the power determining unit 22 in this embodiment may specifically determine a ninth transmission power of the PUCCH, where the ninth transmission power is a transmission power of the PUCCH obtained by the user equipment by performing uplink power control; and determine a seventh transmission power of the preamble according to Formula (17):

$$P'_{PRACH}(i) = \quad (17)$$
$$\min\left\{P_{PRACH}(i), \left(P_{CMAX}(i) - P_{PUCCH}(i) - \sum_c w(i) \cdot P_{PUSCH,c}(i)\right)\right\}$$

where $P'_{PRACH}(i)$ represents the seventh transmission power of the preamble; $P_{PRACH}(i)$ represents the third transmission power of the preamble; $w(i)$ represents a weighting factor, and its value range is [0, 1]; c represents a cell;

$$\sum_c w(i) \cdot P_{PUSCH,c}(i)$$

represents the ninth transmission power of the PUSCH; $P_{PUCCH}(i)$ represents the fifth transmission power of the PUCCH; and $P_{CMAX}(i)$ represents the maximum allowable power.

In another embodiment of the present invention, if the transmission situation determined by the cell determining unit 21 is that a PUSCH needs to be transmitted on another cell in a first subframe among subframes corresponding to the preamble to be transmitted on the secondary cell, the power determining unit 22 in this embodiment may specifically determine an eighth transmission power of the preamble according to Formula (1), where $P_{PRACH}(i)$ represents the eighth transmission power of the preamble; and determine that a tenth transmission power of the PUSCH is 0. Or, the power determining unit 22 in this embodiment may specifically determine an eleventh transmission power of the PUSCH, where the eleventh transmission power is a transmission power of the PUSCH obtained by the user equipment by performing uplink power control; and determine that a ninth transmission power of the preamble is 0. Or, the power determining unit 22 in this embodiment may specifically determine a tenth transmission power of the preamble according to Formula (1), where $P_{PRACH}(i)$ represents the tenth transmission power of the preamble; and determine a twelfth transmission power of the PUSCH according to Formula (20) or determine a thirteenth transmission power of the PUSCH according to Formula (21) and Formula (22):

$$\sum_c w(i) \cdot P_{PUSCH,c}(i) \le (P_{CMAX}(i) - P_{PRACH}(i)) \quad (20)$$

where $w(i)$ represents a weighting factor, and its value range is [0, 1]; c represents a cell;

$$\sum_c w(i) \cdot P_{PUSCH,c}(i)$$

represents the twelfth transmission power of the PUSCH; $P_{CMAX}(i)$ represents the maximum allowable power; and $P_{PRACH}(i)$ represents the tenth transmission power of the preamble; and $$\sum_{c \neq j} w(i) \cdot P_{PUSCH,c}(i) \leq (P_{CMAX}(i) - P_{PUSCH,j}(i) - P_{PRACH}(i)) \quad (21)$$

$$P_{PUSCH,j}(i) = \min\{P_{PUSCH,j\_0}(i), (P_{CMAX}(i) - P_{PRACH}(i))\} \quad (22)$$

where w(i) represents a weighting factor, and its value range is [0, 1]; c represents a cell;

$$\sum_{c \neq j} w(i) \cdot P_{PUSCH,c}(i)$$

represents the thirteenth transmission power of the PUSCH; $P_{CMAX}(i)$ represents the maximum allowable power; $P_{PRACH}(i)$ represents the tenth transmission power of the preamble; and $P_{PUSCH,j\_0}(i)$ represents a transmission power that is of a PUSCH bearing uplink signaling and is obtained by the user equipment by performing uplink power control. Or, the power determining unit 22 in this embodiment may specifically determine a thirteenth transmission power of the PUSCH, where the thirteenth transmission power is a transmission power of the PUSCH obtained by the user equipment by performing uplink power control; and determine an eleventh transmission power of the preamble according to Formula (23):

$$P'_{PRACH}(i) = \min\left\{P_{PRACH}(i), \left(P_{CMAX}(i) - \sum_c w(i) \cdot P_{PUSCH,c}(i)\right)\right\} \quad (23)$$

where $P'_{PRACH}(i)$ represents the eleventh transmission power of the preamble; $P_{PRACH}(i)$ represents the eighth transmission power of the preamble;

$$\sum_c w(i) \cdot P_{PUSCH,c}(i)$$

represents the thirteenth transmission power of the PUSCH; and $P_{CMAX}(i)$ represents the maximum allowable power.

Optionally, the transmission situation determined by the cell determining unit 21 in this embodiment further includes that an SRS needs to be transmitted on another cell in the subframe corresponding to the preamble to be transmitted on the secondary cell, and if a transmission power of the preamble is not 0, the power determining unit 22 in this embodiment may further determine that a transmission power of the SRS is 0.

In this embodiment, a cell determining unit of a user equipment determines a transmission situation of at least one of: a PUCCH, a PUSCH, and an SRS on another cell except a secondary cell in a subframe corresponding to a preamble to be transmitted on the secondary cell, so that the power determining unit can determine an uplink transmission power of the user equipment according to the determined transmission situation, thereby solving a problem that it is not provided in the prior art that how a user equipment determines an uplink transmission power of the user equipment when random access is executed through a secondary cell.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In several embodiments provided in the present application, it should be understood that the disclosed system, apparatus, and method may be implemented in other manners. For example, the apparatus embodiment described in the foregoing is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in the form of hardware, or may be implemented in the form of hardware plus a software functional unit.

The foregoing integrated unit implemented in the form of a software functional unit may be stored in a computer readable storage medium. The foregoing software functional unit is stored in a storage medium, and includes several instructions used to instruct a computer device (which may be a personal computer, a server, or a network device) to perform the steps of the methods in the embodiments of the present invention. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof; however, these modifications or replacements do not make the essence of corresponding technical solutions depart from the spirit and scope of the technical solutions in the embodiments of the present invention.

What is claimed is:

1. A communication method in which a user equipment may communicate with a base station through more than one cell of a wireless communications system, the method comprising:
   determining, by the user equipment, a first transmission power of a preamble random access channel (PRACH) in a secondary cell and a second transmission power of a physical uplink control channel (PUCCH) in a cell other than the secondary cell;
   transmitting, by the user equipment, a random access preamble using the first transmission power on the PRACH in the secondary cell; and
   transmitting, by the user equipment, information using the second transmission power on the PUCCH in the other cell rather than the secondary cell,
      wherein the first transmission power of the PRACH is the smaller of a maximum allowable power of the secondary cell and a sum power, the sum power equals a sum of a target received power of the random access preamble and a target path loss of the secondary cell and the second transmission power of the PUCCH is the smaller of (i) a transmission power of the PUCCH obtained by the user equipment by performing uplink power control and (ii) a difference between the maximum allowable power of the secondary cell and the first transmission power of the PRACH.

2. The method according to claim 1, wherein the first transmission power of the PRACH satisfies:

$$P_{PRACH}(i)=\min\{P_{CMAX,c}(i), \text{PREAMBLE\_RECEIVED\_TARGET\_POWER}+PL_c\},$$

wherein i represents a subframe; $P_{PRACH}(i)$ represents the first transmission power of the PRACH; $P_{cMAX,c}(i)$ represents a maximum allowable power of the secondary cell; PREAMBLE_RECEIVED_TARGET_POWER represents the target received power of the random access preamble; and $PL_c$ represents the target path loss of the secondary cell, c represents a cell.

3. The method according to claim 1, wherein the transmission of the random access preamble on the PRACH is parallel with the transmission of the information on the PUCCH.

4. The method according to claim 1, wherein the second transmission power of the PUCCH is smaller than or equal to a limitation which is equal to the maximum allowable power minus the first transmission power of the PRACH.

5. The method according to claim 1, wherein the second transmission power of the PUCCH satisfies:

$$P_{PUCCH}(i)=\min\{P_{PUCCH\_0}(i),(P_{CMAX}(i)-P_{PRACH}(i))\},$$

wherein $P_{PUCCH}(i)$ represents the second transmission power of the PUCCH; $P_{PUCCH\_0}(i)$ represents a transmission power of the PUCCH obtained by the user equipment by performing uplink power control.

6. A non-transitory computer-readable media storing computer instructions, that when executed by one or more processors, cause the one or more processors to perform operations including:
   determining a first transmission power of a preamble random access channel (PRACH) in a secondary cell and a second transmission power of a physical uplink control channel (PUCCH) in a cell other than the secondary cell;
   transmitting a random access preamble using the first transmission power on the PRACH in the secondary cell; and
   transmitting information using the second transmission power on the PUCCH in the other cell rather than the secondary cell,
      wherein the first transmission power of the PRACH is the smaller of a maximum allowable power of the secondary cell and a sum power, the sum power equals a sum of a target received power of the random access preamble and a target path loss of the secondary cell, and the second transmission power of the PUCCH is the smaller of (i) a transmission power of the PUCCH obtained by the user equipment by performing uplink power control and (ii) a difference between the maximum allowable power of the secondary cell and the first transmission power of the PRACH.

7. The non-transitory computer readable media according to claim 6, wherein the first transmission power of the PRACH satisfies:

$$P_{PRACH}(i)=\min\{P_{CMAX,c}(i), \text{PREAMBLE\_RECEIVED\_TARGET\_POWER}+PL_c\},$$

wherein i represents a subframe; $P_{PRACH}(i)$ represents the first transmission power of the PRACH; $P_{CMAX,c}(i)$ represents a maximum allowable power of the secondary cell; PREAMBLE_RECEIVED_TARGET_POWER represents the target received power of the random access preamble; and $PL_c$ represents the target path loss of the secondary cell, c represents a cell.

8. The non-transitory computer readable media according to claim 6, wherein the transmission of the random access preamble on the PRACH is parallel with the transmission of the information on the PUCCH.

9. The non-transitory computer readable media according to claim 6, wherein the second transmission power of the PUCCH is smaller than or equal to a limitation which is equal to the maximum allowable power minus the first transmission power of the PRACH.

10. The non-transitory computer readable media according to claim 6, wherein the second transmission power of the PUCCH satisfies:

$$P_{PUCCH}(i)=\min\{P_{PUCCH\_0}(i),(P_{CMAX}(i)-P_{PRACH}(i))\},$$

wherein $P_{PUCCH}(i)$ represents the second transmission power of the PUCCH; $P_{PUCCH}$ represents a transmission power of the PUCCH obtained by the user equipment by performing uplink power control.

* * * * *